Fig. 1

June 25, 1940.  D. HEYER  2,205,976
VARIABLE SPEED POWER UNIT
Filed Oct. 8, 1934  6 Sheets-Sheet 2

INVENTOR
Don Heyer
BY
John Flam
ATTORNEY

June 25, 1940.   D. HEYER   2,205,976
VARIABLE SPEED POWER UNIT
Filed Oct. 8, 1934   6 Sheets-Sheet 4

INVENTOR
Don Heyer
BY John Flam
ATTORNEY

Patented June 25, 1940

2,205,976

UNITED STATES PATENT OFFICE 2,205,976

VARIABLE SPEED POWER UNIT

Don Heyer, Los Angeles, Calif., assignor to U. S. Electrical Motors, Inc., a corporation of California Application October 8, 1934, Serial No. 747,410

13 Claims. (Cl. 74—230.17)

This invention relates to an electric motor driven power unit, in which continuous speed variations can be obtained.

Such power units have in general been disclosed in several prior applications filed in the name of Don Heyer or jointly in the name of Don Heyer and others. In these applications, there are disclosed various arrangements of an electric motor in connection with a casing that houses a variable transmission mechanism. This transmission mechanism in all cases comprises a pair of V-belt pulley structures, at least one of which has an adjustable effective diameter. One pulley structure is directly connected to be driven by the motor, and the other pulley structure is arranged to drive a load at adjustable speeds.

In these prior applications, the motor and the load shaft are arranged to have parallel horizontal axes, the axes being spaced apart generally in a horizontal direction. This necessitates a wide supporting base.

These applications can be identified as follows: Don Heyer, Variable speed transmission device, Serial No. 519,764, filed March 3, 1931, Patent No. 1,993,547, issued March 5, 1935; Don Heyer, Variable speed transmission device, Serial No. 631,533, filed September 2, 1932; Don Heyer, Variable speed power unit, Serial No. 640,707, filed November 1, 1932, Patent No. 2,078,196, issued April 20, 1937; Don Heyer, Variable speed drive with multiple belts, Serial No. 667,379, filed April 22, 1933; Don Heyer and Thomas G. Myers, Variable pulley structure, Serial No. 673,333, filed May 29, 1933; Don Heyer and Thomas G. Myers, Variable speed power unit, Serial No. 679,034, filed July 5, 1933; Don Heyer, Ventilated variable speed power unit, Serial No. 711,917, filed February 19, 1934; and Don Heyer, Adjustable speed drive, Serial No. 732,452, filed June 25, 1934.

In the present arrangement, the motor axis and the axis of the load driving shaft are both horizontal, but they are spaced apart generally in a vertical direction. In other words, the motor may be disposed above or below the load driving shaft; and in this way, the unit can be accommodated on a comparatively narrow base.

It is accordingly one of the objects of this invention to provide a construction of this general character.

In the variable or adjustable ratio transmission mechanism utilized in these devices, the driving and the driven pulley structure can have a variable effective diameter; or either of them can have a variable effective diameter, and the other a fixed effective diameter. In the examples of the inventions which will be described, both pulley structures are adjustable; as the effective diameter of one is increased, the effective diameter of the other is decreased by the correct amount to maintain the belt in proper tension at all times.

The variation in effective diameters is accomplished by making each pulley structure with a pair of belt contacting members, axially adjustable toward and from each other. The opposed faces of these members are inclined to form a V groove for the belt. As these faces approach each other, the belt must ride radially outwardly; and the effective diameter correspondingly increases. Conversely, as the inclined faces separate, the belt is permitted to move radially inwardly, and the effective diameter is reduced.

In the above-mentioned prior applications, several different modifications of this general arrangement are shown and claimed. The present invention embodies further modifications; particularly with respect to the mechanism for indicating the speed ratio, the mechanism for shifting certain of the pulley sections, and the arrangement of reduction gearing.

It is another object of this invention to provide an improved form of ventilation for the enclosing casing; and more specifically to provide fans on the pulley sections that can be conveniently balanced.

It is another object to arrange the casing in such a way that access to the interior thereof, for repairs or replacement, is facilitated.

It is still another object of the invention to provide an improved support for the adjustable pulley structure, whereby the sliding sections are mechanically held in proper sliding relation, and without danger of sticking.

It is still another object of this invention to provide a compact and convenient arrangement of parts to permit ready and quick adjustment of the various adjustable elements.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3a is an elevation of the indicating dial;

Fig. 8 is a view similar to Fig. 5, but illustrating the use of a double reduction gear in combination with the driven elements.

Figure 1:
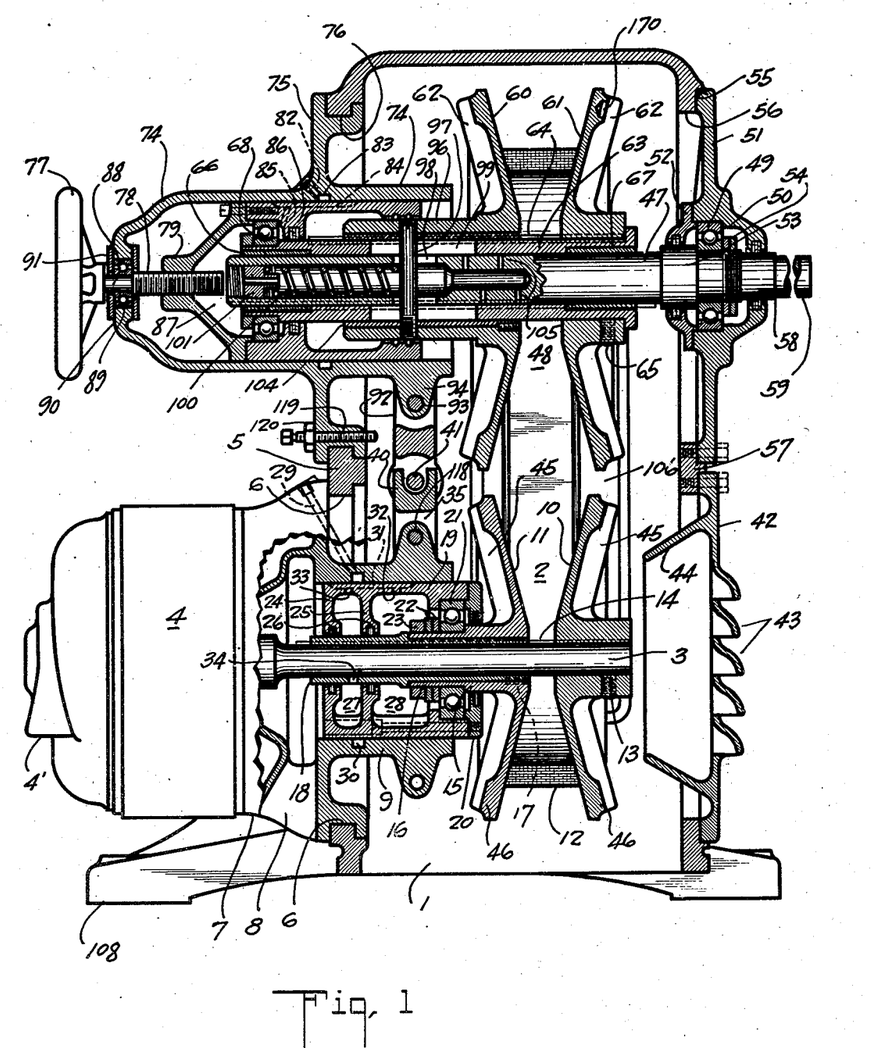
Figure 1 is a view, mainly in vertical section, of an upright power unit incorporating the invention.

In the embodiment of the invention shown in Figs. 1 to 5, an upright casing 1 is shown, in which are housed the driving pulley structure as well as the driven pulley structure, together with their associated controls. In Fig. 1 the driving pulley structure 2 is illustrated as directly mounted upon the motor shaft 3. In the present instance this motor shaft 3 is shown as extended from the motor 4 to form a driving shaft extension. This motor 4 can be of the usual enclosed type, with a downwardly directed bell mouth 4' for the entry or exit of ventilating air.

The motor 4 is shown in this instance as supported on the outside of the vertical wall 5 of the casing 1. The motor shaft 3 has a horizontal axis. It is mounted in a shouldered aperture 6 in this wall 5 as by the aid of bayonet slots. The end frame 7 of this motor is provided with a downwardly directed opening 8 for the admission or discharge of ventilating air. Furthermore, this end frame 7 has a hub 9 which extends through the aperture 6 into the interior of casing 1. This hub 9 serves as a support for various elements of the mechanism whereby the effective diameter of pulley structure 2 can be adjusted.

This pulley structure 2 includes a pair of sections 10 and 11 having opposed inclined faces. These sections 10 and 11 are arranged to be axially adjusted with respect to each other so that the flexible V-belt 12 can be engaged at its opposite edges at different radial distances from the axis of shaft 3. In this way the effective diameter of pulley structure 2 can be adjusted.

In the present instance pulley section 10 is shown as rigidly mounted on shaft 3 as by the aid of a set screw 13 passing through the hub of section 10 and engaging the shaft 3. A key 14 can also be provided further to ensure against relative angular motion.

The section 11 is provided with an elongated hub 15 having a reduced portion 16. This hub is rigidly connected as by one or more pins 17 to a longitudinal sleeve 18 slidable on shaft 13. This sleeve 18 is made from lubricant retaining bronze. It can be keyed to the shaft 3 as by the aid of the key 14.

In order to move section 11 toward and from section 10, use is made of a cup 19, slidable within the hub 9. This cup has a dust-proof cover 20 fastened to the inner end of the cup and serves to maintain a thrust ball bearing 21 in position against a shoulder in the cup 19. This ball thrust bearing thus has its outer race held in a stationary position, and its inner race is held on the extension 16 of hub 15. It is held in place as by the aid of one or more spacers 22 and a lock nut 23. It is apparent that by changing the width and the location of spacers 22 on extension 16, the axial position of pulley section 11 can be adjusted to accommodate varying belt widths. This method of adjusting for belt width is made the subject matter of a prior application filed in the name of Don Heyer, Serial No. 732,452, filed on June 26, 1934, and entitled Adjustable speed drive.

The cup 19 has an end flange 24 and an intermediate flange 25 provided with felt packer washers 26 engaging the sleeve 18. In this way lubrication chambers 27 and 28 are formed inside of the cup 19. A lubricant can be supplied to these chambers as through a passageway 29 through the end frame 7. This passageway communicates with the annular space 30 in the inner surface of hub 9. This annular space in turn communicates with a slot 31 in the outer surface of cup 19. This slot 31 has openings 32 and 33 leading respectively to the chambers 27 and 28.

The lubricant in chamber 27 can pass through opening 34 so as to flow between the sliding surfaces of shaft 3 and sleeve 18. The lubricant in chamber 28 serves to keep the thrust bearing 21 in proper running condition. Furthermore, the lubricant in groove 31 also serves to lubricate the contacting surfaces of cup 19 and hub 9.

In order further to ensure against corrosion or sticking, it is preferred that these contacting surfaces be plated with a non-corrosive layer such as chromium. For example, the shaft 3 can be turned down slightly below a slide fit in sleeve 18. Then a layer of chromium can be deposited thereon to build it up beyond the size required for a sliding fit. After this is accomplished, the chromium plating layer can be ground down by a fine grinding wheel to the desired slide fit size.

Figure 2:
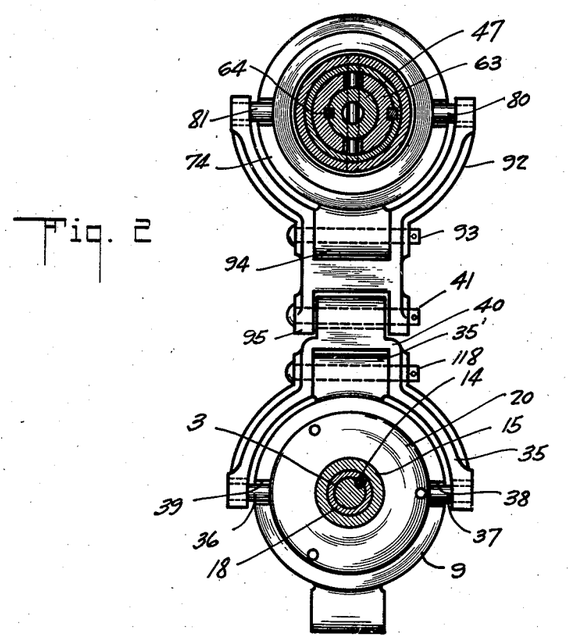
Fig. 2 is a detail sectional view illustrating the manner in which the driving pulley structure as well as the driven pulley structure are adjustable to vary their effective diameters.

The cup 19 is adapted to be axially moved in the hub 9 by the aid of a fork mechanism illustrated most clearly in Fig. 2. In this figure it is seen that a fork 35 embraces the upper half of the hub 9 and is pivoted as by pin 118 in a boss 35', integral with the hub 9. The extremities of the fork are slotted and accommodate pins 36—37 which extend radially from the cup, and through slots 38 and 39 in the sides of the hub 9.

The fork 35 has an upwardly extending clevis 40 engaged by a pin 41. It is apparent that motion of pin 41 in a direction away from the plane of the drawing of Fig. 2 will cause the cup 19 to be moved axially. The manner in which this pin 41 is moved will be described hereinafter.

Opposite the pulley section 10 there is a cover plate 42. This cover plate has a series of downwardly directed louvres 43. It also has an inwardly extending conical deflector 44. This cover plate 42 thus serves as a ventilating opening for the passage of ventilating air. The air inside of casing 1 is arranged to be kept moving, as by the aid of a series of fan vanes 45 integrally attached to the rear of the sections 10 and 11. Adjacent the outer edge of each of the sections an enlarged rim or ring 46 can be provided to assist in balancing. Holes can be drilled in these rims or rings in the course of this balancing process, as illustrated for example at 170, in pulley section 61 immediately above pulley section 10.

The driven shaft 47 in the form shown in Figs. 1, 2, 3 and 4 is disposed above the driving shaft 3. On it is supported a driven pulley structure 48, of the same general character as the driving pulley structure 2, but of somewhat larger diameter.

The right hand end of shaft 47 can be supported as by the aid of thrust ball bearings 49. The outer race of this ball bearing can be secured inside of a boss 50 of a cover plate 51. It is held in place by a dust-proof cap 52. The inner race of bearing 49 is tightened against a shoulder 53 on shaft 47 and is held in place by one or two lock nuts 54. The cover 51 is disposed in an annular seat 55 disposed around an aperture 56 in the vertical wall 57 of casing 1. The boss 50 has an aperture 58 through which the load driving extension 59 of shaft 47 extends.

Driving of the pulley structure 48 is accomplished by the aid of the belt 12 which serves as a mechanical driving connection between the two pulley structures 2 and 48.

In the present instance the pulley structure 48 includes the sections 60 and 61 each provided with rear vanes 62 forming ventilating fans.

The adjustment for varying the effective pulley diameter of pulley structure 48 is accomplished by moving section 61 axially. For this purpose section 61 is rigidly mounted on a sliding sleeve member 63. This is accomplished as by the aid of the key 64 and set screw 65. This sleeve is preferably made from steel, and is chromium plated on its exterior surface. It carries, as shown most clearly in Fig. 3, left and right hand bearing bushings 66 and 67, which are preferably made from lubricant retaining bronze. These bushings slide upon the shaft 47, the inner surface of sleeve 63 between these two bushings being clear of the shaft. In this way the sleeve 63 is supported at widely spaced places on the shaft 47.

The shaft surface can be treated with a non-corrosive layer as described in connection with shaft 3.

In order to support shaft 47, at its left hand end, a ball bearing structure 68 is provided. This ball bearing structure supports the left hand end of sliding sleeve 63 which in turn supports the shaft 47. The ball bearing structure is shown to best advantage in Fig. 3. It is there seen that the outer race is supported against a shoulder 69 in a slidable cylindrical member 70. It is held in place against shoulder 69 as by the aid of a cap 71. The inner race of ball bearing structure 68 is abutted against a shoulder 72 on sleeve 63 and is held tightly against that shoulder as by the clamp nut 73. The sleeve 63 being made from steel, it forms a solid support for bearing structure 68; this is a better arrangement than the use of a sleeve made entirely of bearing bronze.

Figure 4:
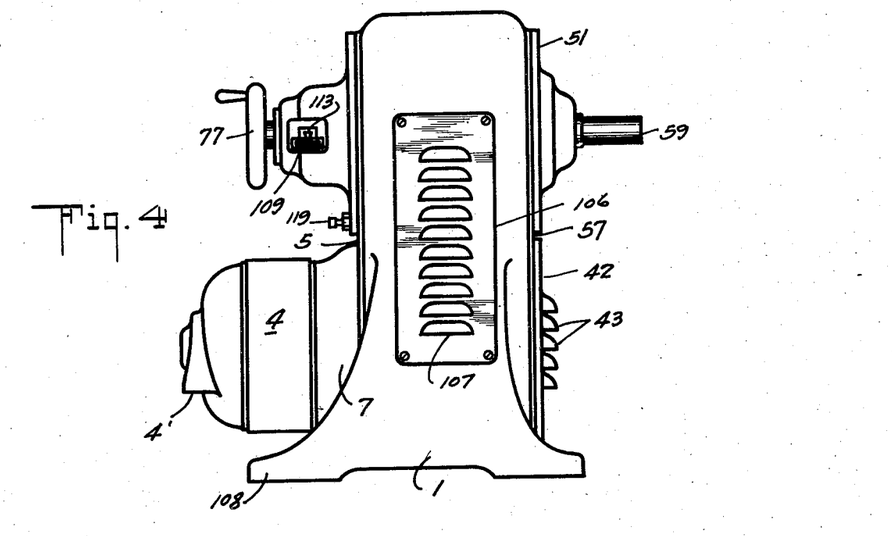
Fig. 4 is a side elevation of the power unit shown in Fig. 1.
Figure 5:
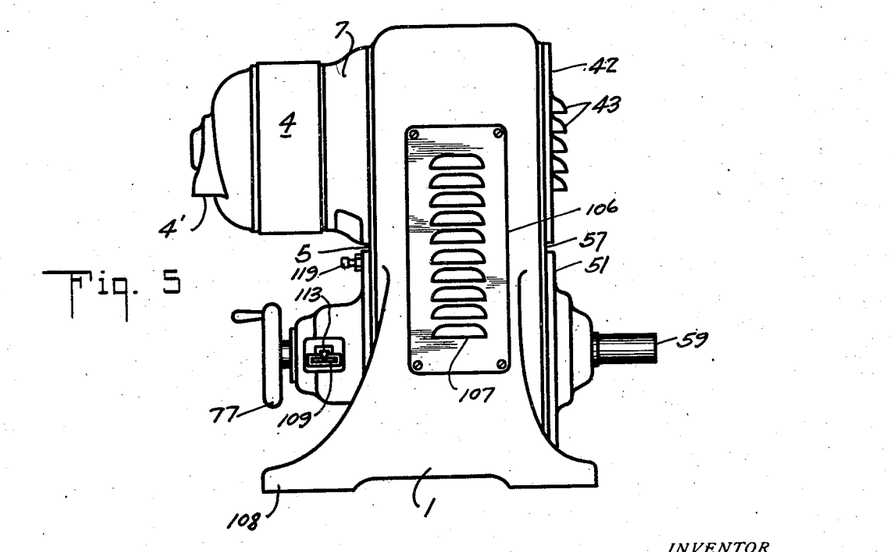
Fig. 5 is a view similar to Fig. 4, but showing the driving elements incorporating the electric motor as interchanged in position with the driven elements.

The cylindrical member 70 is slidable for axially adjusting the position of section 61, within a cylindrical boss 74. This cylindrical boss is shown as integral with a cover plate 75 fastened in an aperture 76 in the vertical wall 5 of the casing 1. The arrangement is such that the aperture 76 is made of identical dimensions as aperture 6 in which motor 4 is supported, whereby it is possible to interchange the position of the motor with the driven pulley structure. This interchanging of position is indicated in Figs. 4 and 5. In Fig. 4 the motor 4 is below the driven pulley structure; and in Fig. 5 it is above the driven pulley structure. In this way the load driving extension 59 can be placed either close to the base of casing 1 or at a considerable distance above this base, whereby the most advantageous position of the load driving shaft can be chosen to suit the conditions of the load.

Similarly the cover member 51 is interchangeable with the cover member 42.

Figure 3:
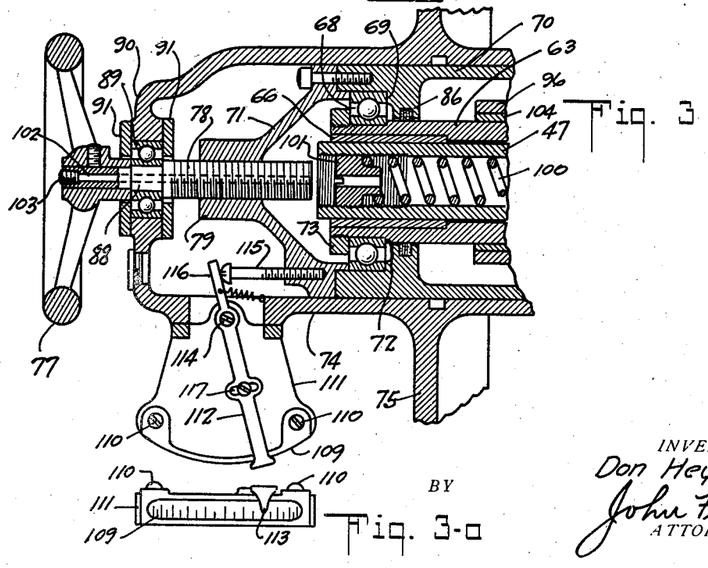
Fig. 3 is an enlarged horizontal sectional view of some of the mechanism for varying the ratio of the power unit.

The advancing of the sleeve 63 toward the left or toward the right is accomplished by the aid of a hand wheel 77. This hand wheel serves to rotate a screw 78 engaging in threads in a boss 79 of cap 71. Rotation of cylindrical member 70 is effectively prevented as by the aid of the radial pins 80 and 81 which project through appropriate slots in the boss 74.

Lubrication for the bearings and the sliding surfaces is provided for by the aid of a conduit 82 leading to an annular space 83 surrounding the cylindrical member 70. This annular space communicates with a slot 84 in the outer surface of the cylinder member 70. From this slot 84 there leads a passageway 85 to the chamber 87 formed between the cap 71 and an intermediate flange 86. It is in this chamber that the ball bearing structure 68 is located.

The screw 78 is provided with a smooth portion 88 for the accommodation of a thrust ball bearing structure 89. This thrust ball bearing structure is located in the end wall 90 of boss 74. The ball bearing is held against axial displacement as by the aid of collars 91.

It is apparent that upon rotation of wheel 77 the sleeve 63 with its associated pulley section 61 is adjusted axially with respect to pulley section 60. This adjusting motion is caused to move the driving pulley section 11 in the same direction. This is accomplished by the aid of a forked member 92 (Fig. 2). The extremities of this fork are slotted to accommodate the pins 80—81 and the fork is oscillated about the axis of pin 93 passing through ear 94 integral with the cylindrical boss 74. The lower extremity of fork 92 carries ears 95 for the accommodation of pin 41 which acts in the clevis 40 of the lower fork 35.

It is apparent that as the cylindrical member 70 moves toward the right to decrease the effective diameter of pulley structure 48, due to the separation of section 61 from section 60, the pulley section 11 will be correspondingly moved by the fork 34, to move pulley section 11 toward pulley section 10, thereby increasing the effective diameter of the driving pulley.

The left pulley section 60 of the driven pulley structure 48 is splined as by key 64 to the sleeve 63. Instead of being maintained absolutely stationary, this section 60 is arranged to be urged under spring pressure toward the right to take up for belt wear. For this purpose the hub 96 of pulley section 60 is elongated to provide a long sliding surface. Through the hub extends a pin 97. The left hand end of the shaft 47 is slotted as shown at 98 to permit the pin 97 to pass therethrough; and similarly sleeve 63 is slotted as shown at 99 to permit relative axial adjustment between the sleeve and the pin. The spring for urging pulley section 60 to take up for belt wear is indicated at 100. At its right hand end it abuts against the pin 97. Its left hand end abuts against an adjustable headless screw 101 threaded in the left hand end of the hollow portion of shaft 47. This headless screw can be adjusted as by the aid of a screw driver entering through the axial opening 102 (Fig. 3) through the screw 78 attached to handwheel 77. This opening can be normally closed as by a headless screw 103.

It is apparent that relative angular motion between pulley section 60 and shaft 47 is prevented not only by the use of the spline 64 but also by the engagement of pin 97 in slots 98 and 99. In order to secure a good sliding surface between hub 96 and chromium plated steel sleeve 63, an appropriate bearing bronze bushing 104 can be fastened inside of the hub 96.

Some lubricant may pass into the hollow portion of the shaft 47; and it may be thrown out by centrifugal force against the surface of sleeve 63 by the provision of radial apertures 105.

In order to facilitate inspection or replacement of the variable ratio transmission mechanism in housing 1, it is preferable to provide a pair of side covers such as 106 (Figs. 4 and 5) fastened to the opposite vertical walls of casing 1. These plates 106 can be provided with downwardly extending louvres 107 for the free passage of ventilating air. Furthermore, as shown most clearly in Figs. 1, 4 and 5, the casing 1 has a forwardly extending foot 108 to lend stability to the structure. This foot 108 extends a considerable distance forwardly of the casing and underneath the overhanging structures at the left hand side of the casing. The bottom of the casing as indicated in Fig. 1 is entirely open.

In order to provide a speed or a ratio indicating device, a circular dial 109 is provided. This dial is fastened as by screws 110 to a supporting member 111, in turn supported on the boss 74. A pointer 112 extends from inside of boss 74 to the outside thereof and has a downwardly directed pointer end 113 cooperating with scale 109. This pointer is pivoted as by the aid of a screw 114 and its inner end is subjected to a force exerted by an adjustable screw 115 fastened to the cap 71. A spring can be used to urge the extension 116 against the head of screw 115. The pointer 112 furthermore can be made in two parts relatively adjustable to make it possible to calibrate the scale. Both parts can be provided with slots such as indicated at 117 to permit slight angular displacement between the pointer end 117 and the inwardly projecting extension 116.

It is noted that the distance between the center of pins 93 and 41 is greater than the distance between the pins 41 and 118 upon which fork 34 is pivoted. Thus fork 34 moves pulley section 11 at a different rate from the rate at which pulley section 61 is moved. This is utilized to ensure that the belt will remain tight for all positions of adjustments. It is fully described and claimed in an application filed in the name of Don Heyer on February 19, 1934, Serial No. 711,917, for Ventilated variable speed power unit.

In order to limit the adjustment of the adjustable sections 11 and 61 use is made of an adjustable abutment in the form of a screw 119. This screw is threaded through the cover member 75 and its inner end is adapted to cooperate with the lower arm of shift fork 92. It is held in adjusted position as by a nut 120.

Figure 6:
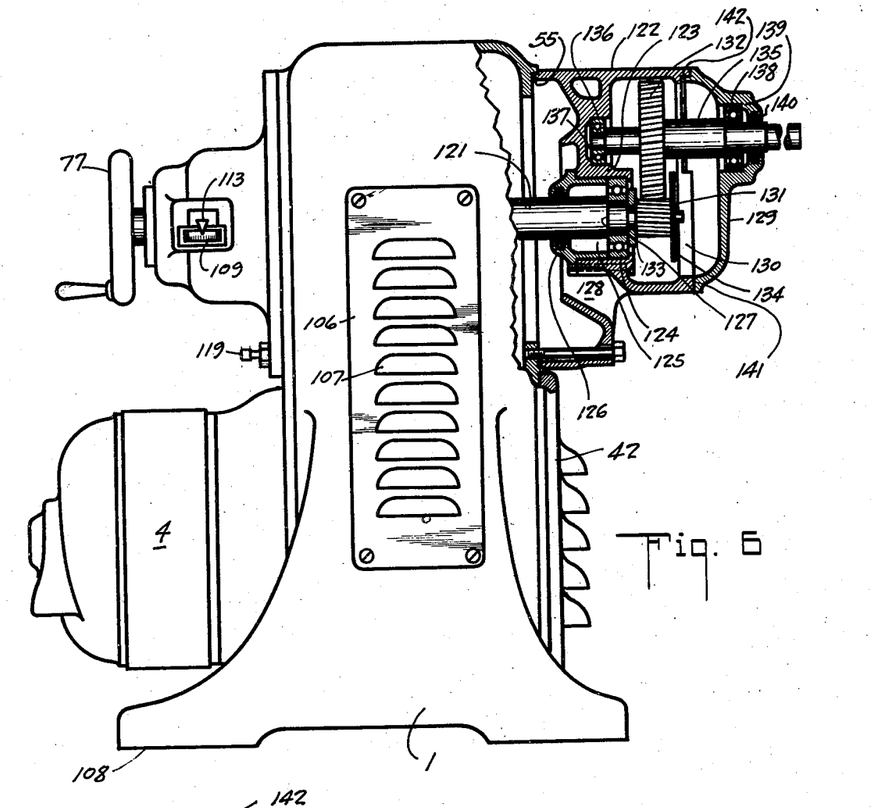
Fig. 6 is a view similar to Fig. 4, showing a further modification in which a single reduction gear train is connected to the driven shaft further to reduce the speed of driving of the load.
Figure 7:
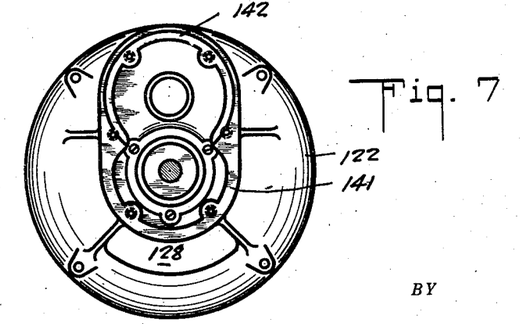
Fig. 7 is an end elevation of the gear case shown in Fig. 6, with the cover removed.

In the form of the invention shown in Figs. 6 and 7, the driven shaft 121 is shown as extended toward the right to drive a single reduction gear mechanism, so that low speed load operation is secured. In this instance the gear case 122 is shown as replacing the cover member 51, and is machined to fit the circular opening 55. This gear case has an intermediate hub 123 accommodating a thrust ball bearing 124.

This ball bearing is enclosed in a chamber 125. Its outer race is held between the dust proof cap 126, provided with a lubricant retaining seal, and the flange of hub 123. Its inner race is held against the shoulder 127 of the driven shaft 121. This space 125 can be supplied with oil or other lubricant, from the gear case 122; and space 125 is made of extended length to prevent escape of oil into the housing 1.

The space to the left of the intermediate hub 123 is open to the atmosphere as by a downwardly directed passage 128 for the transfer of air in or out of the casing 1. The right hand portion of the gear case 122 can be closed as by a cover member 129. In the space 130 formed to the right of the hub 123 is located the helical pinion 131 and the corresponding helical gear 132. The pinion 131 is fastened to the right hand extremity of the driven shaft 121 and is spaced from the bearing 127 as by collar 133. The space 130 can also be filled with lubricant such as oil, and a lubricant throwing disc 134 can be accommodated at the right hand end of the pinion 131.

The gear 132 is supported on the load driving shaft 135. This load driving shaft is supported at one end between ball bearing structure 136 supported in a recess 137 in the gear case 122. The right hand end of the load driving shaft 135 is similarly supported by a ball bearing structure 138 in boss 139 of the cover 129. A lubricant retaining washer 140 of felt or other yielding material can be used in boss 139.

The cover 129 is accommodated over the flat surface 141, which is a finished surface at the right hand side of the gear casing 122. At the upper end there is a recess or depression providing a shoulder 142, concentric with shaft 135, to center or locate the cover 129 accurately with respect to the case 122.

It is to be noted that since the gear case 122 is supported on a circular shoulder, it is possible to rotate the entire gear case about the axis of shaft 121 in order to provide varying positions of the load driving shaft 135.

Figure 9:
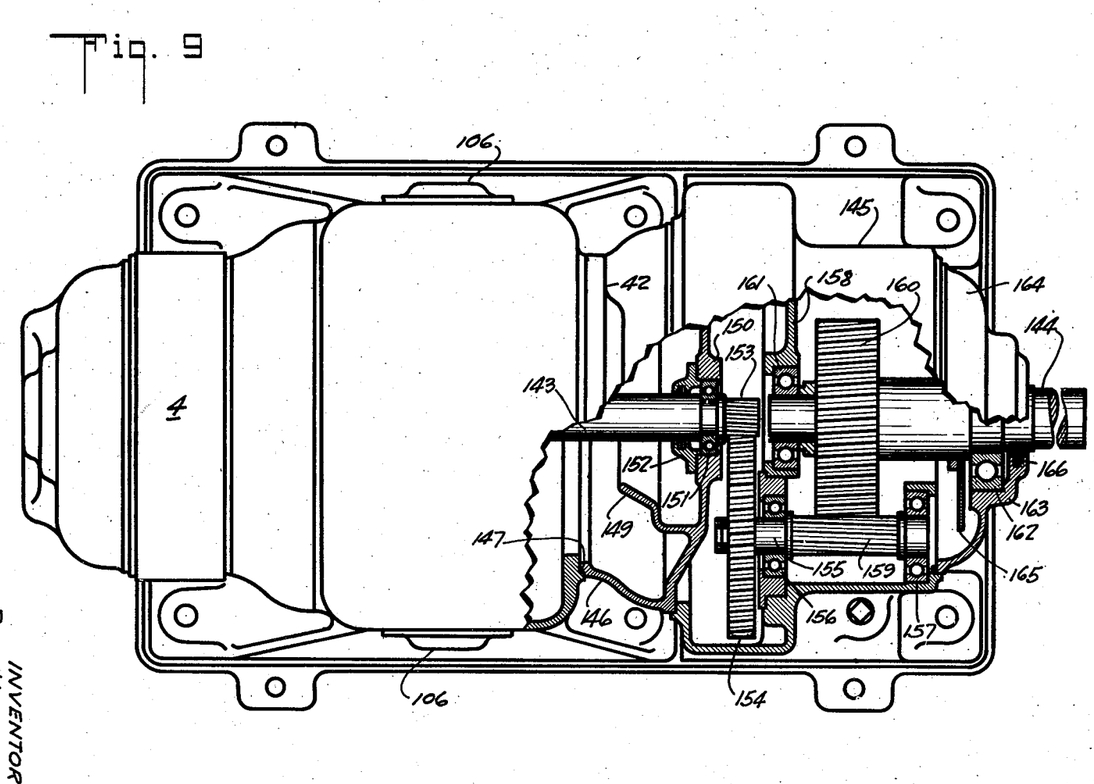
Fig. 9 is a top plan view partly in section of the unit shown in Fig. 8.

In the form of the invention shown in Figs. 8 and 9, the driving motor 4 is shown as disposed vertically above the driven shaft 143. In this instance there is a double reduction gearing, in which the load driving shaft 144 extends out of the gear casing 145 concentrically with the driven shaft 143. The gear case is made in this instance in three parts. The inner part 146 forms virtually an end frame for motor 4 and is accommodated in the aperture 147 in the side of the casing 1. This end frame has a downwardly directed opening 148 to the exterior of the casing as well as an inwardly directed deflecting flange 149. At the right hand end of this frame there is a boss 150. In this boss is accommodated a ball thrust bearing structure 151 for supporting the right hand end of the driven shaft 143. A dust cap 152 provides a lubricant chamber for the ball bearing structure 151.

At the right hand extremity of driven shaft 143 is the pinion 153 which meshes with a gear 154 as shown in Fig. 9. This gear is mounted on a shaft 155, supported at spaced points by the bearing structures 156 and 157. These bearing structures are located respectively in the intermediate wall 158 of the gear case proper 145 and the right hand end wall of this gear case. Intermediate these bearings 156 and 157 there is a wide driving pinion 159 which meshes with the gear 160. This gear 160 is mounted on the load driving shaft 144. This load driving shaft has a thrust ball bearing structure 161 in the intermediate wall of the casing 145. At the right hand end the load driving shaft 144 is supported by a similar ball bearing structure 162. This ball bearing structure is supported in the boss 163 of the end cover 164. The shaft 144 carries an oil slinger disc 165. The space between the right hand wall of member 146 and the cover 164 can be supplied with lubricant, having a level high enough to reach gear 160 and oil slinger 165. The oil can be confined against escape as by appropriate lubricant retaining seals, such as felt washers. Such a washer 166 is illustrated in boss 164.

It is apparent that by making the gear casing and covers interchangeable as well as the positions of the driving and driven transmission elements, a wide variety of combinations of drives can be obtained with the same mechanism.

The mode of operation is apparent from the foregoing. The casing is adequately ventilated and a wide range of speed is obtainable by the manipulation of the hand wheel 77.

I claim:

1. In combination, a casing, a variable speed transmission mechanism in said casing and including a horizontal driving and a horizontal driven shaft, means for adjusting the speed ratio of said variable speed transmission, said driven shaft having a portion extending out of the casing for connection to a load, one of said shafts being vertically above the other, a source of power supported by the casing, supports for the shafts, for said ratio adjusting means and for the source of power, supported on the walls of the casing, said supports being interchangeable so that the relative positions of the driving and the driven shafts can be interchanged.

2. In an adjustable pulley structure having a pair of relatively axially adjustable sections with opposed inclined faces, forming by axial adjustment, variable effective pulley diameters, the combination therewith of a hollow shaft supporting said sections, a spring in the shaft resiliently urging one pulley section in one direction, means including a screw for adjusting the axial position of the other of said pulley sections, said screw being axially alined with the shaft, and an enclosure for the shaft, said enclosure having an aperture formed therein for providing access to said spring for adjusting the pressure thereof, and said screw being available for manipulation outside of the enclosure.

3. In an adjustable pulley structure having a pair of relatively axially adjustable sections with opposed inclined faces, forming by axial adjustment, variable effective pulley diameters, the combination therewith of a hollow shaft supporting said sections, a spring in the shaft resiliently urging one pulley section in one direction, means including a screw for adjusting the axial position of the other of said pulley sections, said screw being axially alined with the shaft, and an enclosure for the shaft, said screw being available for manipulation outside of the enclosure, and having an axial aperture to permit entry of a tool for adjusting the spring pressure.

4. In combination, a casing, an adjustable ratio transmission mechanism in said casing, said mechanism including V-belt pulley structures, at least one of them having opposed adjustable pulley sections, the axes of the pulley structures being horizontal and arranged one above the other, an electric motor supported by the aid of an aperture in the outer wall of the casing, shafts for said pulley structures, one of said shafts being driven by said motor, and the other shaft being adapted to drive a load, means carried by the walls of the casing for supporting the driving pulley structure and the driven pulley structure, the said means being interchangeable to permit a reversal of the relative positions of the driving and driven shafts, and a reduction gear structure adapted to be supported on the exterior of the casing, and in driving relation with the driven pulley structure, said gear structure being so associated with the driven shaft as to form a unit therewith irrespective of any change in position of said driven shaft.

5. In a geared adjustable speed power transmission, an adjustable ratio power transmission including a driving pulley structure, a driven pulley structure and a belt for transmitting power between said pulley structures, each of said pulley structures having an adjustable effective diameter and including a pair of pulley sections with opposed inclined faces, forming by relative axial adjustment variable effective pulley diameters, a casing having walls enclosing and means for supporting said pulley structures, a gear transmission having a driving shaft, a driven shaft and gear members for transmitting power from said driving shaft to said driven shaft, said driven pulley structure being in coaxial driving relation to said driving shaft of said gear transmission, a gear housing enclosing said gear transmission, said driven shaft having a load driving extension projecting outside of said gear housing, means for securing said gear housing to the wall of said casing adjacent said driven pulley structure, and a sub-base secured to said casing and to said gear housing, and providing common means for supporting said gear transmission and said adjustable ratio power transmission.

6. In a geared adjustable speed power transmission, an adjustable ratio power transmission including a driving shaft, a driven shaft, a driving pulley structure mounted on said driving shaft, a driven pulley structure mounted on said driven shaft, and a belt for transmitting power between said pulley structures, at least one of said pulley structures having an adjustable effective diameter and including a pair of pulley sections having opposed inclined faces, forming by relative axial adjustment variable effective pulley diameters, a casing having walls enclosing said pulley structures and means for supporting said driven shaft, a load driving shaft, a gear transmission having gears for transmitting power from said driven shaft to said load driving shaft, the driving gear of said gear transmission being in coaxial driving relation to said driven shaft and said load driving shaft having its axis substantially parallel to the axis of said driven shaft, a gear housing having walls enclosing and supporting said gear transmission, and a sub-base removably secured to said casing and to said gear housing, said gear housing and said casing having supporting surfaces formed thereon for engaging said sub-base.

7. In combination, a casing having a pair of opposite facing vertical walls, each of said walls having a pair of supporting surfaces formed thereon, the supporting surfaces formed on each wall being substantially equivalent and disposed one above the other and the pair of surfaces formed on one wall being substantially opposite to the pair of surfaces formed on the opposite facing wall, an adjustable ratio transmission mechanism in said casing, said mechanism including a driving shaft, a driven shaft, a driving pulley structure mounted on said driving shaft, a driven pulley structure mounted on said driven shaft and a belt for transmitting power between said pulley structures, at least one of said pulley structures having an adjustable effective diameter, whereby the variation in speed ratio is obtained, an electric motor supported on a wall of the casing and in driving relation to the driving shaft, bearing means for rotatably supporting said driving shaft and supported by one of said pair of supporting surfaces formed on one of said walls, and bearing means for rotatably supporting said driven shaft and supported by one of said supporting surfaces vertically displaced from said driving shaft, said pair of vertically displaced and substantially equivalent supporting surfaces formed on each of said opposite facing walls providing means whereby the adjustable ratio transmission mechanism may be assembled with the driven shaft above or below the driving shaft, and the motor associated with said shaft.

8. The structure as set forth in claim 7, in which said casing is provided with a second pair of opposite facing vertical walls, each of said second pair of walls having an aperture formed therein providing access to said belt and pulley structures, and a pair of removable covers for respectively closing the apertures formed in said second pair of opposite facing walls.

9. In combination, a casing, a variable speed transmission mechanism in said casing, including a horizontal driving shaft and a horizontal driven shaft, as well as means for adjusting the speed ratio of the variable speed transmission, one of said shafts being disposed above the other; a source of power supported by the casing and operatively associated with the driving shaft, and means adapted so to support said shafts, the ratio adjusting means and the source of power, that the relative positions of the shafts with respect to the casing may be interchanged, the source of power and the driving shaft in interchanged position occupying the first position of the driven shaft and the ratio adjusting means.

10. In combination, a casing, a variable speed transmission mechanism in said casing, including a horizontal driving shaft and a horizontal driven shaft, as well as adjustable pulley structures respectively mounted on said shafts, one of said shafts being disposed above the other; means associated with one of the pulley structures for adjusting its effective diameter, interlocking means between the pulley structures for adjusting the other pulley structure, an electric motor associated with said other pulley structure, means supporting the driving shaft, the electric motor and the driving pulley structure upon the casing, and means supporting the driven shaft, the driven pulley structure and the means for adjusting the effective diameter of the driven pulley structure upon the casing, said two supporting means being interchangeable in position with respect to the casing.

11. In combination, a casing, a variable speed transmission mechanism in said casing, including a horizontal driving shaft and a horizontal driven shaft, as well as adjustable pulley structures respectively mounted on said shafts, one of said shafts being disposed above the other; an electric motor for driving one of said shafts, means supporting the driving shaft with its associated driving pulley structure, and the motor on one wall only of the casing, in such manner that the motor is at least partly external of the casing, and means supporting the driven shaft and its associated pulley structure upon the casing, said two supporting means being interchangeable in position with respect to the casing.

12. In combination, a casing, a variable speed transmission mechanism in said casing, including a horizontal driving shaft, a horizontal driven shaft, and means for adjusting the speed ratio of said transmission associated with the driven shaft, one of said shafts being disposed above the other; a source of power operatively associated with the driving shaft, and means cooperating with said casing, said means and the casing being adapted so to support said shafts, the ratio adjusting means and the source of power, that the relative positions of the ratio adjusting means and the source of power, together with their associated shafts, may be interchanged with respect to the casing, the source of power and the driving shaft in interchanged position occupying the first position of the driven shaft and the ratio adjusting means.

13. In combination, a casing, a variable speed transmission mechanism in said casing including a horizontal driving shaft, a horizontal driven shaft as well as adjustable pulley structures mounted respectively on said shafts, one of said shafts being disposed above the other, a gearing structure having gearing in operative relation to the driven shaft and a gear case, said gear case having means providing a support for one end of the driven shaft, means providing a support for the other end of the driven shaft, means providing a support for the driving shaft, and means cooperating with the casing, said means and the casing being adapted so to support said gear case and the support providing means for the shafts, that the relative positions of the gear case and the supporting means for the driven shaft may be interchanged with the supporting means for the driving shaft, the driving shaft in interchanged position occupying the first position of the driven shaft.

DON HEYER.